Feb. 14, 1961 H. W. BRYANT ET AL 2,972,021

TELEPHONE SUBSTATION APPARATUS

Filed July 3, 1958 3 Sheets-Sheet 1

INVENTORS H.W. BRYANT
H.G. JORDAN
G.C. PORTER

BY Edwin B. Cave

ATTORNEY

INVENTORS H. W. BRYANT
H. G. JORDAN
G. C. PORTER
BY Edwin B. Cave
ATTORNEY

TELEPHONE SUBSTATION APPARATUS

Filed July 3, 1958 3 Sheets-Sheet 3

INVENTORS H. W. BRYANT
H. G. JORDAN
G. C. PORTER
BY Edwin B. Cave
ATTORNEY

United States Patent Office 2,972,021

Patented Feb. 14, 1961

2,972,021

TELEPHONE SUBSTATION APPARATUS

Herbert W. Bryant, Chatham, N.J., Homer G. Jordan, Lafayette, Ind., and George C. Porter, Martinsville, N.J., assignors to Bell Telephone Laboratories, Incorporated, New York, N.Y., a corporation of New York Filed July 3, 1958, Ser. No. 746,551

10 Claims. (Cl. 179—100)

This invention relates to telephone substation sets and particularly to telephone sets wherein the receiver performs the signaling function.

The receiver in such telephone sets is capable of emitting audible tones in response to incoming call signaling as well as performing the speech translating function. Receiver signaling is enabled when the set is in either of two conditions, namely: one, when the set is in the "on-hook" condition; two, when the set is in the "off-hook" condition with the switchhook, nevertheless, depressed. When the set is in condition two, there is the danger that the user might be subjected to an acoustical shock. For example, it is notorious that many users habitually depress the switchhook plunger manually while holding the receiver to the ear in order to "flash" the operator or to terminate one call preparatory to initiating another call. A probability exists that the user will be subjected to an acoustical shock caused by an incoming call signal occurring at these instances.

Therefore, the objects of this invention include: the provision of improved receiver signaling apparatus; the enabling of receiver signaling without discomforting the user; the achievement of the aforementioned objects with simple, reliable and economical means.

The invention, hereinafter illustrated by a specific embodiment thereof, achieves the aforementioned objects by the provision of a switching mechanism comprising a set of contacts operable to electrically couple or uncouple a receiver and a receiver signaling exciter, a pair of independently operable plungers for actuating the contacts to couple the receiver and the exciter only when both the plungers are depressed, and a barrier for separating each plunger from the other plunger to inhibit the depression of both plungers by means other than cradling a hand telephone.

Therefore, the features of this invention include: the provision of means for disabling receiver signaling if any or none of the switchhook plungers is depressed; the provision of a barrier between the switchhook plungers tending to prevent simultaneous manual depression of the plungers.

Other objects and features as well as a fuller understanding of the invention will be apparent by referring to the following description and claims, taken in conjunction with the accompanying drawings, in which:

Figure 1:
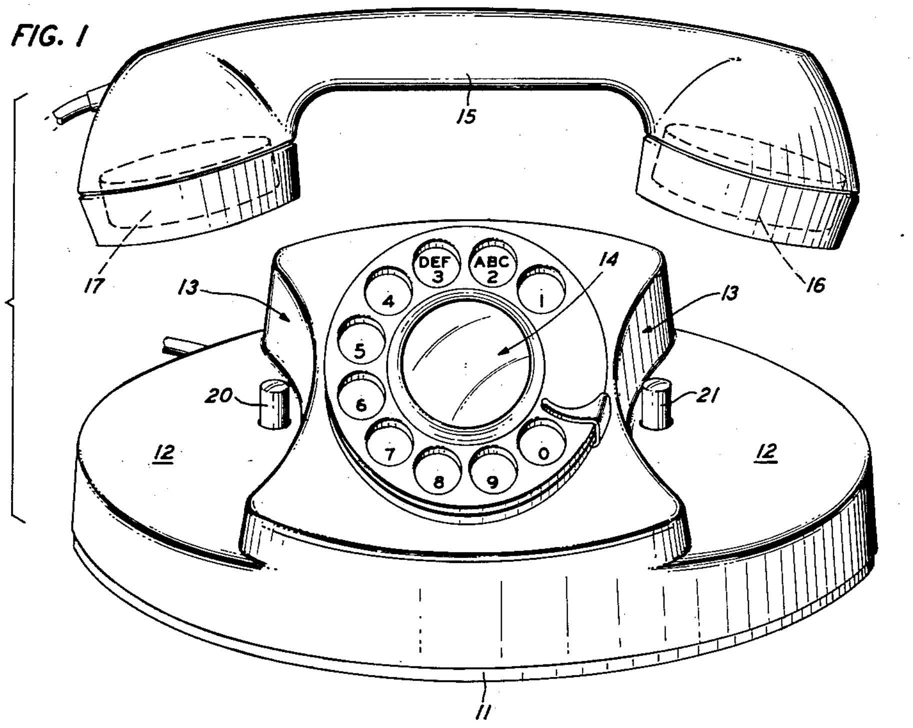
Fig. 1 is a perspective view of a telephone of the handset type showing the telephone in the "off-hook" condition.
Figure 2:
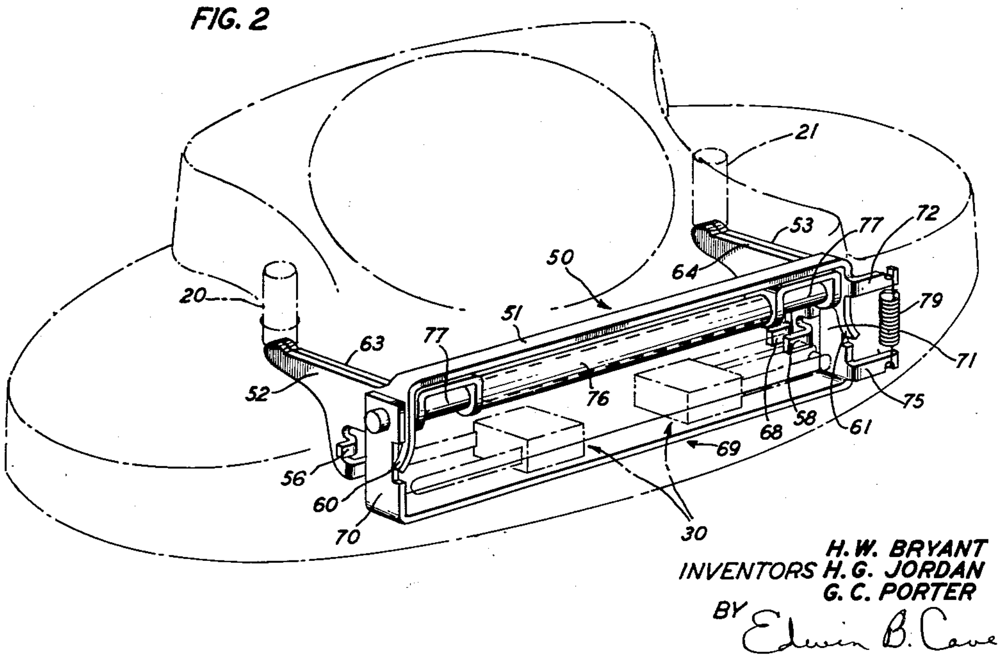
Fig. 2 is a view of an assembled switch actuating mechanism located within a telephone set's casing.
Figure 3:
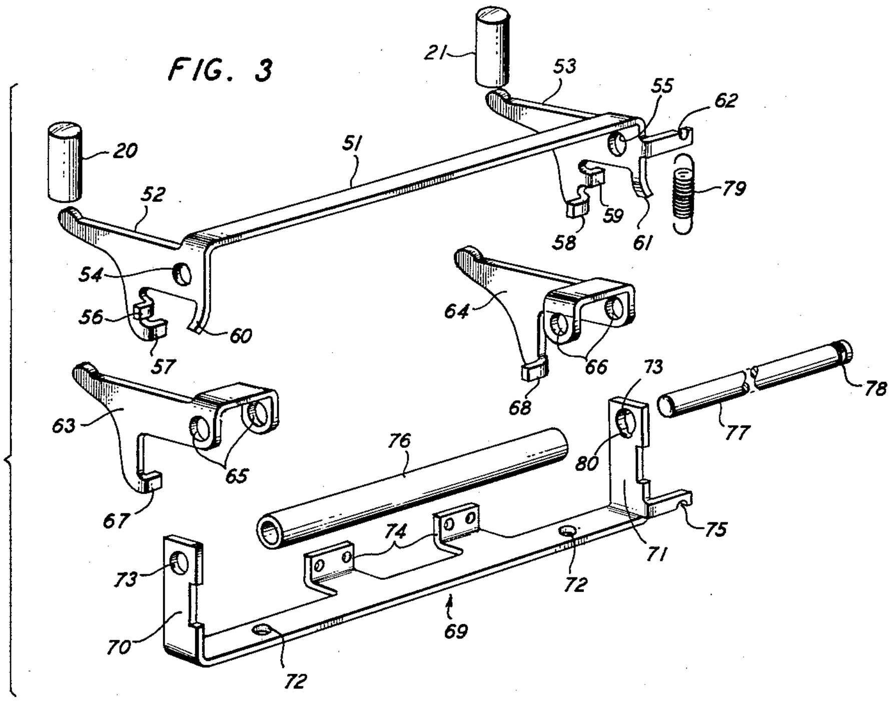
Fig. 3 is an exploded view of the switch actuating mechanism showing the component parts thereof.

Referring to the drawings and especially to Figs. 1, 2 and 3, a switch actuating mechanism, generally designated by the reference character 50, is mounted on a base plate 11 in conjunction with a switch assembly 30. The casing, generally designated by the reference character 12, encloses, inter alia, the switch actuating mechanism and the switch assembly and is fastened to the base plate. Apertures are provided in the casing for receiving the plungers 20 and 21. An upright portion 13, having a dial mechanism 14 mounted thereon, is formed in the upper part of the casing and serves to separate and shield one plunger from the other plunger.

As indicated in Fig. 1, the walls of the upright portion 13 that are adjacent the plungers are laterally recessed to receive the end caps of the handset 15 when the handset is "cradled" by placing it on the casing so as to straddle the upright portion 13 and dial mechanism 14 causing the handset's end caps to depress the plungers.

The handset 15 (Fig. 1) has a receiver 16 and a transmitter 17 located at opposing ends of a common handle.

Figure 4:
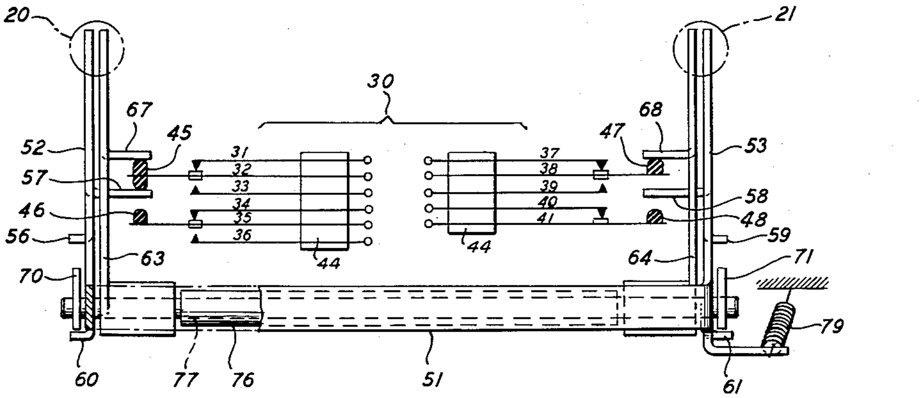
Fig. 4 is a view, partly in schematic form, of the switch actuating mechanism looking down on the mechanism as it is shown in Fig. 2 and shows the relationship among various parts of the mechanism when the telephone is in the "off-hook" condition.

Referring now to Figs. 2, 3 and 4, the switch actuating mechanism 50 comprises the joined lever arms 52 and 53, the separate levers 63 and 64, a mounting bracket 69, the hollow cylinder 76, the longitudinal pivot member 77, and tensioning spring 79.

The lever arm 52 includes: the aperture 54, extension tabs 56 and 57, and the rotational stop member 60. The lever arm 53 includes: the aperture 55, extension tabs 58 and 59, rotational stop member 61, and the spring support 62. The lever arm 52 is joined with lever arm 53 by the longitudinal main bar 51.

The levers 63 and 64 have extension tabs 67 and 68, respectively, formed thereon in addition to the apertures 65 and 66, respectively, formed therein.

The mounting bracket, generally designated by the reference character 69, includes the uprights 70 and 71, the switch assembly brackets 74, and the apertures 72. The apertures 73 are provided in the uprights 70 and 71. Furthermore, a notch 80 and a spring support 75 are formed in the upright 71. The notch 80 is located adjacent to aperture 73.

The joined lever arms 52 and 53 as well as the main bar 51, levers 63 and 64, and mounting bracket 69 may be stamped from flat metal stock and thereafter punched and formed. For example, a lightweight metal, such as aluminum or the like, may be used. If desired, a hardened plastic compound may be moulded to form these component parts.

The longitudinal pivot member 77 having a groove 78 formed in one end thereof may be formed from a lightweight material such as aluminum or hardened plastic compound. The hollow cylinder 76 may be fabricated from the same materials.

The switch assembly 30, shown in Fig. 4 and schematically in Figs. 5, 6, 7 and 8, comprises the leaf spring electrical contacts 31, 32, 33, 34, 35, 36, 37, 38, 39, 40 and 41; the insulating blocks 44 separating each of the electrical contacts from each other; and the insulating pins 45, 46, 47 and 48 affixed to the ends of the electrical contacts 32, 35, 38 and 41, respectively. The indicated arrangement of electrical contacts and insulating blocks may be assembled and fastened together by any of the well known means and, thereafter, mounted and fastened upon the switch assembly brackets 74.

The switch actuating mechanism 50 may be assembled in conjunction with the switch assembly 30 in the following manner:

After fastening the bracket 69 to the base plate 11 by the insertion of fastening means through the apertures 72, the pivot member 77 is inserted serially through: aperture 73 in upright 71, aperture 55 in lever arm 53, both apertures 66 in lever 64, the aperture in cylinder 76, both apertures 65 in lever 63, the aperture 54 in lever arm 52, and aperture 73 in upright 70. The pivot member 77 may be locked in place and horizontally aligned by setting the grooved portion 78 into the notch 80 in the upright 71. When the tensioning spring 79 is attached between the spring supports 62 and 75, the main bar 51 including its attendant lever arms 52 and 53 is constrained to assume the "off-hook" condition indicated in Fig. 2 whereby the lever arms 52 and 53 are adjacently aligned with the levers 63 and 64, respectively. As indicated in Fig. 3, the rotational stop members 60 and 61 are oriented to bear against the uprights 70 and 71, respectively, so that the lever arms 52 and 53 are limited from progressing upward from the alignment indicated as aforesaid in Fig. 2. Similarly, lever arms 52 and 53 are limited by tabs 56 and 59, respectively, from progressing downward. As indicated in Fig. 4 the levers 63 and 64 are prevented from freely rotating about the pivot member 77 because the tabs 67 and 68 are impeded by the insulating pins 45 and 47, respectively.

As indicated schematically in Figs. 5, 6, 7 and 8, the subset's electrical network comprises a receiver 16; a pair of transmission line terminals, L1 and L2; a signaling network, designated as such; and a speech network, designated as such.

The speech network for translating intelligence-modulated currents is familiar in the telephone art. For example, an elemental speech circuit is disclosed in the United States Patent No. 2,392,321 to R. E. Hersey, issued January 8, 1946.

The signaling network functions to translate incoming signaling currents to the receiver to cause the receiver to emit audible tones in response thereto. For example, 20-cycle incoming signals may be multiplied to 1100 cycles and amplified by a transistor oscillator circuit.

Figure 6:
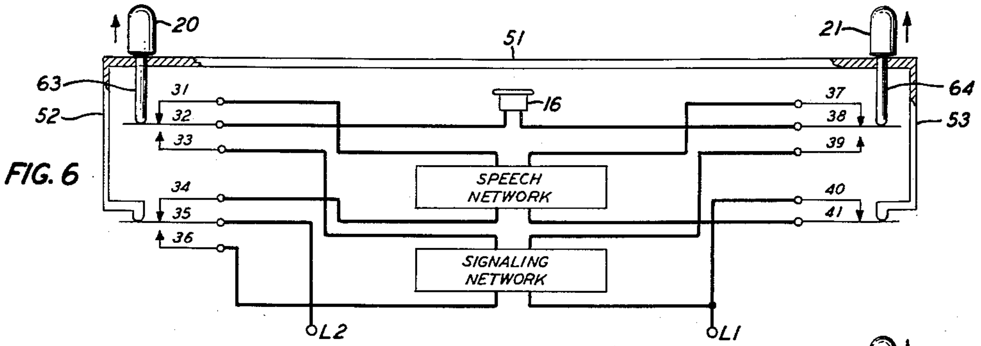
Fig. 6 is a schematic representation, partly in block diagram form, showing pertinent circuit connections for the "off-hook" condition.
Figure 7:
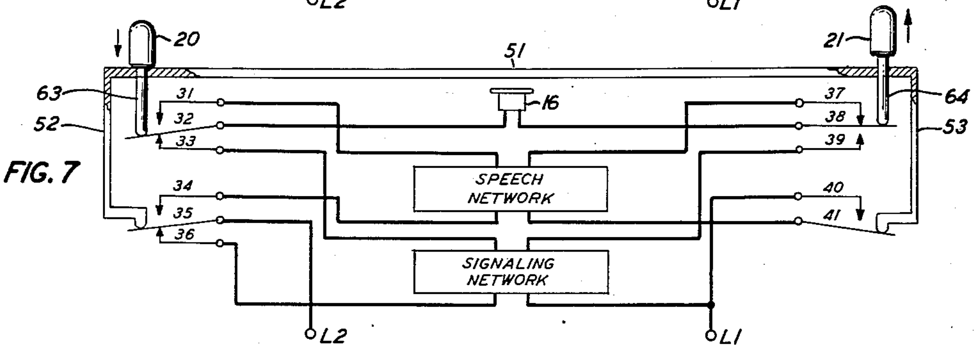
Fig. 7 is a schematic representation, partly in block diagram form, showing pertinent circuit connections when the left plunger, only, is depressed.
Figure 8:
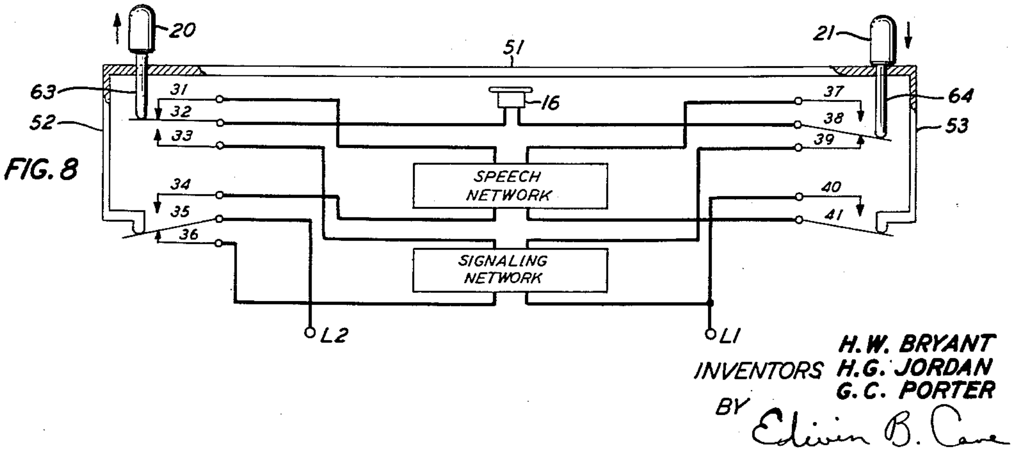
Fig. 8 is a schematic representation, partly in block diagram form, showing pertinent circuit connections when the right plunger, only, is depressed.

Assuming that neither of the switchhook plungers is depressed, the telephone set being in the "off-hook" condition, the switch assembly's electrical contacts are in the status shown in Figs. 4 and 6 whereby the signaling network is electrically disconnected from the receiver 16 and from transmission line L2, but the speech network is connected to both transmission lines, L1 and L2, and to the receiver 16.

Figure 5:
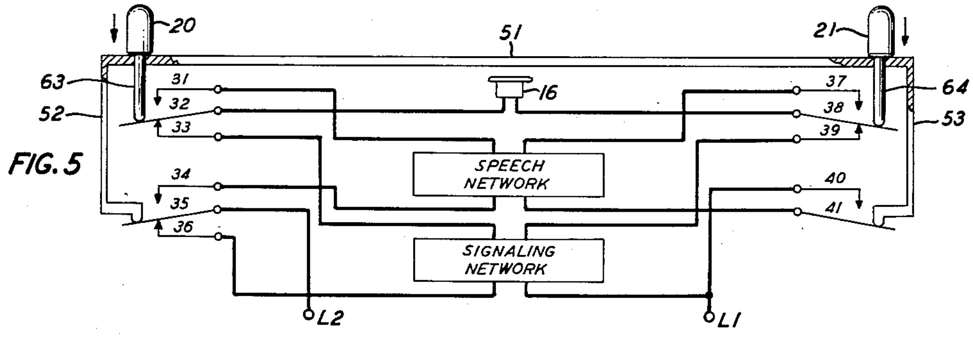
Fig. 5 is a schematic representation, partly in block diagram form, showing pertinent circuit connections for the "on-hook" condition.

If the user causes the depression of both the switchhook plungers by cradling the handset 15, the telephone subset assumes the "on-hook" condition, indicated in Fig. 5, whereby the signaling network is electrically connected to the transmission lines, L1 and L2, and the receiver 16 so that the receiver is thereby enabled to emit audible incoming call signals. A comparison of the Figs. 4 and 6 with the Fig. 5 will indicate that the following activity occurs whenever both switchhook plungers are depressed: The lever arms 52 and 53 as well as the levers 63 and 64 pivot downwardly about the pivot member 77 causing the tabs 67, 57, 68 and 58 to engage the insulating pins 45, 46, 47 and 48 causing contacts 32, 35, 38 and 41 to assume the status indicated schematically in Fig. 5.

If either of the switchhook plungers is depressed when the telephone set is in the "off-hook" condition, the signaling network remains disconnected from the receiver 16 which is consequently prevented from emitting audible signals. A comparison of Figs. 5 and 6 with the Figs. 7 and 8 will indicate the switching activity that occurs whenever one plunger, only, is depressed. For example, if the plunger 20, only, is depressed the lever arms 52 and 53 as well as the lever 63 are pivoted downwardly about the pivot member 77 causing the tabs 67, 57 and 58 to engage the pins 45, 46 and 48 and thereby cause the contacts 32, 35 and 41 to assume the status indicated in Fig. 7. Similarly, if plunger 21, only, is depressed, the lever arms 52 and 53 as well as the lever 64 are pivoted downwardly causing the tabs 57, 68 and 58 to engage the pins 46, 47 and 48 thereby causing contacts 35, 38 and 41 to assume the status indicated in Fig. 8. In the situations illustrated in Figs. 7 and 8, the respective contact pairs 38—39 or 32—33 remain open leaving the signaling network disconnected from the receiver in either case.

Inasmuch as the casing's upright portion 13 acts as a barrier between the plungers 20 and 21, it prevents facile simultaneous depression of both plungers by the user's hand.

Although the invention has been described in but one specific embodiment thereof, it should be understood that the present disclosure has been made only by way of example and that numerous changes in the details of construction and the combination and arrangements of parts may be made without departing from the spirit and scope of the invention as is hereinafter claimed.

What is claimed is:

1. In a telephone subset, a handset including a receiver, a transmission line termination, a signaling circuit for causing the receiver to emit audible tones in response to incoming call signaling, a cradle for the handset, a switching means associated with the cradle and comprising first and second independently operable plungers separated from each other by a barrier means to prevent facile simultaneous operation of both plungers by means other than cradling or uncradling of the handset, a first linkage operable by the first plunger, a second linkage operable by the second plunger, a third linkage operable by either or both plungers, first and second serially connected switch means operable by the first and second linkages, respectively, for coupling the receiver with the signaling circuit and a third switch means operable by the third linkage for coupling the line termination with the signaling circuit whereby both plungers are required to be depressed before receiver signaling is possible.

2. In a telephone subset, a handset including a receiver connected between a first and a second switch means, a transmission line termination connected with a third switch means, a first network for translation of intelligence-modulated currents, a second network for translation of incoming signaling currents, a cradle for the handset having an upright member affixed thereto, a switch actuating means comprising first and second plungers, each plunger being independently operable and shielded from the other plunger by the upright member to prevent facile simultaneous operation of both plungers by means other than cradling or uncradling the handset, a first linkage operable by the first plunger for operating the first switch means, a second linkage operable by the second plunger for operating the second switch means and a third linkage operable by either or both of the plungers for operating the third switch means whereby the simultaneous depression of both plungers couples the transmission line with the second network and the receiver, and the depression of neither of the plungers couples the transmission line with the first network and the receiver.

3. In a telephone subset, a handset including a receiver, a transmission line termination, a signaling circuit for causing the receiver to emit audible tones in response to incoming call signaling, a cradle for the handset including an upright member mounted thereon, a switching means associated with the cradle and comprising first and second plungers, each plunger being independently operable and laterally shielded from the other by the upright member to prevent facile simultaneous operation of both plungers by means other than cradling or uncradling of the handset, a common linkage operable by either or both plungers, first and second serially connected switch means operable by the first and second plungers, respectively, for coupling the receiver with the signaling circuit, a third switch means operable by the common linkage for coupling the line termination with the signaling circuit, whereby both plungers are required to be depressed before receiver signaling is possible.

4. In a telephone subset, a handset including a receiver, a transmission line termination, a signaling circuit for causing the receiver to emit audible tones in response to incoming call signaling, a cradle for the handset, a switching means associated with the cradle and comprising first and second plungers, each plunger being independently operable and widely spaced from the other to prevent facile simultaneous operation of both plungers by means other than cradling or uncradling of the handset, a first linkage operable by the first plunger, a second linkage operable by the second plunger, a third linkage operable by either or both plungers, first and second serially connected switch means operable by the first and second linkages, respectively, for coupling the receiver with the signaling circuit, a third switch means operable by the third linkage for coupling the line termination with the signaling circuit, whereby both plungers are required to be depressed before receiver signaling is possible.

5. In a telephone subset, a handset including a receiver, a cradle means for the handset, a signaling circuit means for causing the receiver to emit audible tones in response to incoming call signaling, and a switching means comprising a set of contacts operable to electrically couple or uncouple the receiver with the signaling circuit means, a plurality of actuating elements operable by the cradling of the handset for actuating the set of contacts to couple the receiver with the signaling circuit means, a barrier means for shielding each actuating element from the other actuating elements to prevent the facile manual operation of all the actuating elements.

6. A switching assembly for a telephone set having a handset including a signaling receiver, and a cradle for the handset; said switching assembly comprising contact means selectively operable for either permitting or preventing receiver signaling, a pair of spaced-apart movable members operable by the cradling or the uncradling of the handset, separate linkages operable by and extending from each movable member to the contact means, and an additional linkage operable by either or both of the movable members and extending to the contact means, whereby the separate linkages and the additional linkage are required to be operated to cause the contact means to permit receiver signaling.

7. A switching assembly for a telephone set having a handset including a signaling receiver, and a cradle for the handset; said switching assembly comprising contact means selectively operable for either permitting or preventing receiver signaling, two spaced-apart movable members operable by the cradling or the uncradling of the handset, a first linkage operable by one of the movable members and connected with the contact means, a second linkage operable by the other movable member and connected with the contact means, and a third linkage operable by either or both of the movable members and connected with the contact means, whereby all of the linkages are required to be operated to cause the contact means to permit receiver signaling.

8. A telephone subset comprising a subset housing including a raised portion situated centrally thereon, a handset including a receiver unit and a transmitter unit, a pair of plungers associated with the housing and separated from each other by the raised portion intervening therebetween, said plungers being operated by placing the handset on the housing so that the receiver unit depresses one plunger and the transmitter unit depresses the other plunger, signaling circuit means, and switch means operable by the depression of both of the plungers for coupling the signaling circuit means with the receiver unit whereby the receiver unit is enabled to emit audible signals in response to incoming call signaling.

9. A telephone subset comprising a subset housing including a raised portion situated centrally thereon, a handset including a handle having a receiver unit and a transmitter unit on opposing ends of the handle, a pair of plungers associated with the housing and separated from each other by the raised portion intervening therebetween, said plungers being operated by placing the handset on the housing so that as the handle straddles the raised portion the receiver unit depresses one plunger and the transmitter unit depresses the other plunger, signaling circuit means, contact means operable for coupling the signaling circuit means with the receiver unit to enable the receiver unit to emit audible signals in response to incoming call signaling, and linkage means responsive to the depression of both of the plungers for operating the contact means.

10. A telephone subset comprising a subset housing including a raised portion situated thereon, a handset including a receiver unit and a transmitter unit, a pair of actuating elements associated with the housing and separated from each other by the raised portion intervening therebetween, signaling circuit means adaptable of being coupled with the receiver unit to enable the receiver unit to emit audible signals in response to incoming call signaling, said circuit means and receiver unit being coupled by the actuation of both of the actuating elements when the handset is placed on the housing so that the receiver unit actuates one of the elements and the transmitter unit actuates the other element.

References Cited in the file of this patent

UNITED STATES PATENTS 2,686,844 Brewer ---------------- Aug. 17, 1954